United States Patent [19]
Winser

[11] Patent Number: 5,495,563
[45] Date of Patent: Feb. 27, 1996

[54] APPARATUS FOR CONVERTING PYRAMIDAL TEXTURE COORDINATES INTO CORRESPONDING PHYSICAL TEXTURE MEMORY ADDRESSES

[75] Inventor: Paul A. Winser, Redhill, England

[73] Assignee: U.S. Philips Corporation, New York, N.Y.

[21] Appl. No.: 641,228

[22] Filed: Jan. 15, 1991

[30] Foreign Application Priority Data

Jan. 15, 1990 [GB] United Kingdom ................ 9000841

[51] Int. Cl.$^6$ .................................................. G06F 15/00
[52] U.S. Cl. .................................................. 395/130
[58] Field of Search ................................ 395/130, 162, 395/164, 165, 425, 166, 400; 345/154, 153, 139

[56] References Cited

U.S. PATENT DOCUMENTS

| 4,047,160 | 9/1977 | Wolf | 395/425 |
| 4,445,170 | 4/1984 | Hughes et al. | 395/400 |
| 4,615,013 | 9/1986 | Yan et al. | 364/521 |
| 4,808,988 | 3/1989 | Burke et al. | 395/143 |
| 4,833,599 | 5/1989 | Colwell et al. | 364/200 |
| 4,998,214 | 3/1991 | Ryan | 395/109 |
| 5,047,958 | 9/1991 | Comins et al. | 395/166 |
| 5,113,505 | 5/1992 | Holtz | 395/400 |

OTHER PUBLICATIONS

"Pyramidal Parametrics", L. Williams, Computer Graphics, vol. 17, No. 3 Jul. 1983, pp. 1–11.
"Survey of Texture Mapping", P. S. Heckbert, IEEE Computer Graphics and Applications, Nov. 1986, pp. 56–67.

Primary Examiner—Phu K. Nguyen

[57] ABSTRACT

A display apparatus includes a host processor (14) with associated main memory (24) and a display processor with associated display memory (30) and texture memory (41'). The host processor includes an arrangement (18) for storing in the texture memory (41') at least one pyramidal or part-pyramidal array of texel values representing a given texture at at least two levels of resolution defined by respective values of a level coordinate (L) and an arrangement (18) for supplying object primitive data to the display processor (28',49). The display processor includes a processing unit (28') for generating from the object primitive data a series of pixel addresses (X,Y) for application to the display memory (30) and a corresponding series of 2-D texture coordinate pairs (U,V) each with an associated level coordinate (L), to effect a mapping of the stored texture onto the object primitive at a level or levels of resolution defined by the level coordinate (L). The texture memory includes a linearly addressed (one-dimensional) texture memory (41'). The arrangement for storing the pyramidal or part-pyramidal array of texel values includes an arrangement (D1) for storing each 2-D array thereof in linear form in the texture memory (41'). A texture management circuit (49) includes circuitry (50) for receiving and storing page location information (SWI1,W1,B1) for locating each such array in the texture memory. The texture management circuit (49) further includes circuitry (50 to 63) for using the stored page location information to convert the received texture coordinate pair (U,V) and level coordinate (L) into a linear physical texture memory address (A1).

18 Claims, 4 Drawing Sheets

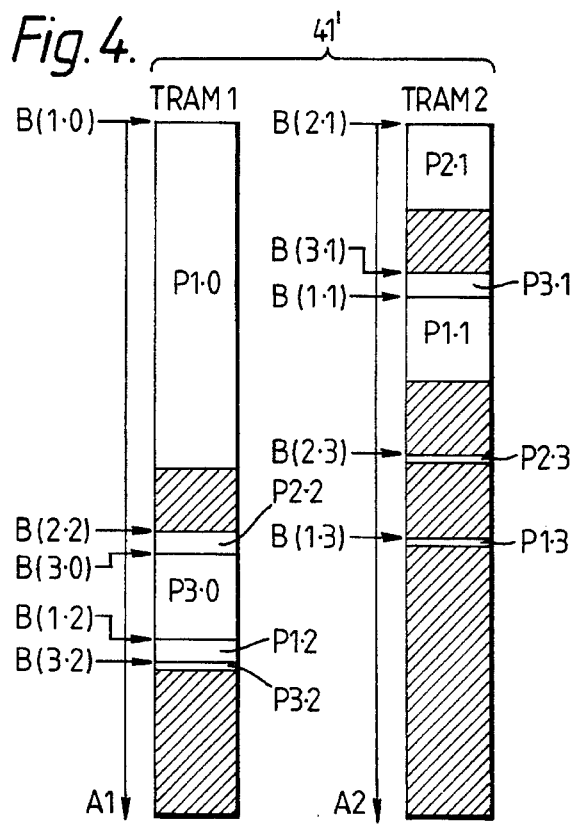
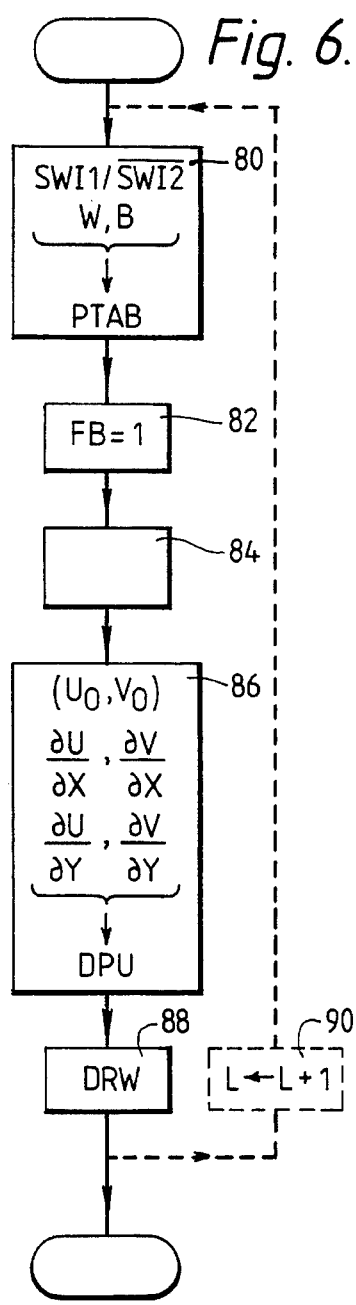
Fig. 4.
Fig. 5.
Fig. 6.

APPARATUS FOR CONVERTING PYRAMIDAL TEXTURE COORDINATES INTO CORRESPONDING PHYSICAL TEXTURE MEMORY ADDRESSES

CROSS-REFERENCE TO RELATED APPLICATIONS

This application is related to co-pending U.S. patent application Ser. No. 07/641,386 and Ser. No. 07/641,387 (PHB 33,612 and PHB 33,613), both filed concurrently with this application.

BACKGROUND OF THE INVENTION

1. Field of the Invention

The invention relates to a circuit arrangement for converting pyramidal texture coordinates into corresponding physical texture memory addresses in an electronic display apparatus, the arrangement comprising:

a pyramidal coordinate input for receiving a two-dimensional (2-D) texture coordinate pair and an associated level coordinate; and means for generating from the received coordinate pair and level coordinate a corresponding physical texture memory address.

The invention further relates to a display apparatus comprising a host processor with associated main memory for the storage of object primitive data and texture definitions and a display processor with associated display memory and texture memory, the host processor comprising:

means for storing in the texture memory at least one pyramidal or part-pyramidal array of texture element ("texel") values comprising a plurality of two-dimensional (2-D) arrays of texel values representing a given 2-D modulation pattern ("texture") at at least two levels of resolution defined by respective values of a level coordinate; and means for supplying object primitive data to the display processor, including an indication that a pattern of modulation is to be applied to the object primitive in accordance with texel values stored in the pyramidal array in the texture memory;

the display processor comprising:

means for generating from the object primitive data a series of pixel addresses for application to the display memory and a corresponding series of 2-D texture coordinate pairs each with an associated level coordinate, to effect a mapping of the stored modulation pattern onto the object primitive at a level or levels of resolution defined by the associated level coordinate; and means comprising a circuit arrangement as set forth above, for receiving each 2-D texture coordinate pair and associated level coordinate and for generating therefrom a physical texture memory address for application to the texture memory.

2. Description of the Related Art

Such an apparatus is described in WO 85/00913, corresponding to U.S. Pat. No. 4,615,013, and provides real-time synthesis and display of images representing three-dimensional (3-D) scenes for flight simulation. The known display apparatus implements a technique known in the art as "texture mapping", in which a 2-D pattern (the "texture") is pre-generated and stored in the texture memory, whereupon a single primitive is then rendered (transformed from "object space" into "screen space" and scanned into the display memory) with the texture mapped onto it. The technique enables a large amount of surface detail to be represented without a corresponding increase in the number of primitives that have to be rendered to produce an image. In a simple case, the stored pattern defines the color of an object's surface, so that the texel values may constitute the color values which may be written directly into the display memory. In a more general case, the texel values may be subjected to or otherwise control further processing, in particular to allow the rapid calculation of complex lighting variations, reflections and so on.

Texture mapping can be implemented entirely in software, but in the context of the present invention we are concerned with hardware implementations in the field of real-time image synthesis. To avoid aliasing effects, it is necessary to filter the texel values during mapping. To avoid excessive computation, the known apparatus stores textures in so-called pyramidal arrays, comprising a succession of 2-D arrays each pre-filtered to a different level of resolution. Suitable filtering methods for the generation and storage of pyramidal texture arrays are described by Lance Williams in a paper entitled "Pyramidal Parametrics" in *Computer Graphics,* Volume 17, No. (July 1983) at pages 1 to 11.

The known hardware implementation adopts the "multum in parvo" or "MIP map" method of storage as described by Williams, whereby three color components (R, G and B) of a single texture are stored in a square, 2-D addressable memory. The MIP map allows a compact storage and very efficient retrieval of pyramidal texture maps using a 2-D memory, since the physical address generating means is reduced to a pair of simple bit-shifting circuits.

A disadvantage of the MIP map is that memory is occupied by a complete pyramid even though only a very few levels are likely to be required at a given time. Even if unused levels were deleted from the array, the specialised design of the 2-D addressing hardware means that making efficient use of the freed space would severely complicate both hardware and software. It is useful to be able to store different sizes and shapes of texture map, but this too is wasteful when using the conventional 2-D texture memory.

SUMMARY OF THE INVENTION

It is an object of the invention to enable improved efficiency of texture memory utilization, while not unduly increasing the cost or complexity of the texture mapping hardware.

The invention provides a circuit arrangement as set forth in the opening paragraph, characterized in that the physical address is a linear (one-dimensional) address and in that the means for generating the physical texture memory address comprises:

page location means for generating from the received level coordinate information locating a corresponding array of texel values in a linear address space; and a texture address converter comprising means for using the said page location information to convert the received 2-D texture coordinate pair and level coordinate into a linear physical texture memory address.

The invention further provides a display apparatus as set forth in the second opening paragraph, characterized in that the texture memory comprises a linearly addressed (one-dimensional) texture memory, in that the means for storing the pyramidal or part-pyramidal array of texel values comprises means for storing each 2-D array in linear form in the texture memory, and means for generating page location information for locating each such array in the texture memory, and in that the means for generating the physical texture memory address comprises a circuit arrangement in accordance with the invention as set forth in the preceding paragraph arranged to receive the series of 2-D texture coordinate pairs and level coordinates and to generate therefrom a series of linear physical texture memory addresses. The invention is based on a recognition that the advantages of the conventional MIP map storage in a 2-D texture memory can be outweighed by the constraints imposed when it is desired to improve the performance of the hardware without a proportionate increase in cost and/or complexity. The linear texture memory, coupled with the circuit arrangement of the invention (referred to hereinafter as the texture management circuit) provides freedom to store each 2-D array in any suitable space in the memory. Thus the various levels of a pyramidal array need not be stored in any particular relation to each other, and complete pyramids need not be stored when only a few levels are needed for rendering.

The page location means may comprise:

means for receiving in advance page location information for locating a number of different arrays; and page table memory means for storing the received page location information for subsequent reproduction in response to received level coordinates.

The page location information may for example be supplied by the host processor at the same time as it stores each array in the texture memory. The page location table can then give a rapid translation from level coordinate to the location of the relevant array. The information may also identify a required one from several pyramidal or part-pyramidal arrays representing different textures stored in the same linear memory.

The page location information generated by the page location means may include information defining a linear base address and a width value for the corresponding array. In such an embodiment, the texture address converter may comprise:

offset generating means for combining the 2-D texture coordinate pair with the width value and the level coordinate to generate a linear (one-dimensional) offset address; and linear address generating means for combining the base address with the generated offset to generate a linear physical texture memory address for application to a linearly-addressed texture memory.

The offset generating means can be simplified if the width value and/or the scaling factor between levels of the pyramid are restricted to powers of 2.

To avoid aliasing, interpolation between adjacent texel values within a 2-D array may be desired. In one embodiment, therefore, the circuit arrangement further comprises:

means for generating n (n=3 or more) further physical addresses to form a group of n+1 physical addresses all corresponding to the same level coordinate but with 2-D texture coordinate pairs offset from the received coordinate pair so as to allow parallel addressing of a group or "patch" of n+1 texel values in a stored array.

In a corresponding embodiment of the display apparatus including such a circuit arrangement, the linear texture memory is divided into n+1 parallel-addressed memories (n=3 or more) and the texel value storage means are arranged to distribute the texel values being stored among the n+1 memories in an interleaved manner so that, for each 2-D coordinate pair applied to the circuit arrangement, texel values for a 2-D patch of texels may be read out in parallel, the display apparatus further comprising 2-D interpolation means responsive to fractional parts of the 2-D texture coordinate pair for combining texel values of a 2-D patch into a single interpolated value. This avoids increasing the number of memory read cycles per pixel as would otherwise be necessary to read a 2-D patch. Simple bilinear interpolation will generally suffice.

The display apparatus may further comprise means for generating a 2-D array of texel values for storage in the texture memory as part of a pyramidal array by causing systematic readout and 2-D interpolation of the texel values in a previously stored 2-D array forming a first level of the pyramidal array, and feedback means for storing the resulting interpolated texel values in the memory (in linear form) to form a 2-D array of texel values to form a second, lower-resolution level of the said pyramidal array. This embodiment relies on the fact that by selecting certain texture coordinate pairs, the interpolated texel values can be made equal to corresponding stored texel values of the next lower resolution array in the pyramid. This opens the possibility of the mapping hardware generating within itself at high speed a pyramidal or part-pyramidal array from just one externally generated high-resolution 2-D array.

To avoid sharp transitions in the displayed resolution, interpolation between levels of the pyramid may also be desired. In a further embodiment, the circuit arrangement further comprises:

means for generating a further physical address (or group of n+1 physical addresses) corresponding to the same 2-D texture coordinate pair (or group of n+1 texture coordinate pairs) but with a level coordinate offset from the received level coordinate; and selection means responsive to the page location information whereby the physical address(es) and the further physical address(es) may be applied to different ones of two parallel-addressable texture memory banks.

In a corresponding embodiment of the display apparatus, including such a circuit arrangement, the texture memory comprises separate first and second linearly addressable texture memory banks, the texel value storage means being arranged to store the 2-D arrays forming successive levels of a given pyramidal or part-pyramidal array alternately in the first and second texture memory banks, the circuit arrangement being arranged to apply the physical address(es) and further physical address(es) to the first and second texture memory banks in such a manner that texel values for two adjacent levels of a given pyramidal array may be read out in parallel, the display apparatus further comprising an interpolator responsive to a fractional part of the level coordinate for combining texel values from both levels into a single interpolated texel value. This page-alternate dual-bank texture memory approach avoids duplicating memory read cycles in a manner which is very simple to implement.

BRIEF DESCRIPTION OF THE DRAWINGS

Embodiments of the invention will now be described, by way of example, with reference to the accompanying drawings in which:

FIG. 4 illustrates the storage of three pyramidal texture maps in two linear texture memories in the hardware of FIG. 3;

FIG. 5 illustrates the contents of a page table memory in the hardware of FIG. 3; and FIG. 6 illustrates the generation of filtered 2-D arrays using feedback in the hardware of FIGS. 3 to 5.

DETAILED DESCRIPTION OF THE PREFERRED EMBODIMENTS OF THE INVENTION

Figure 1:
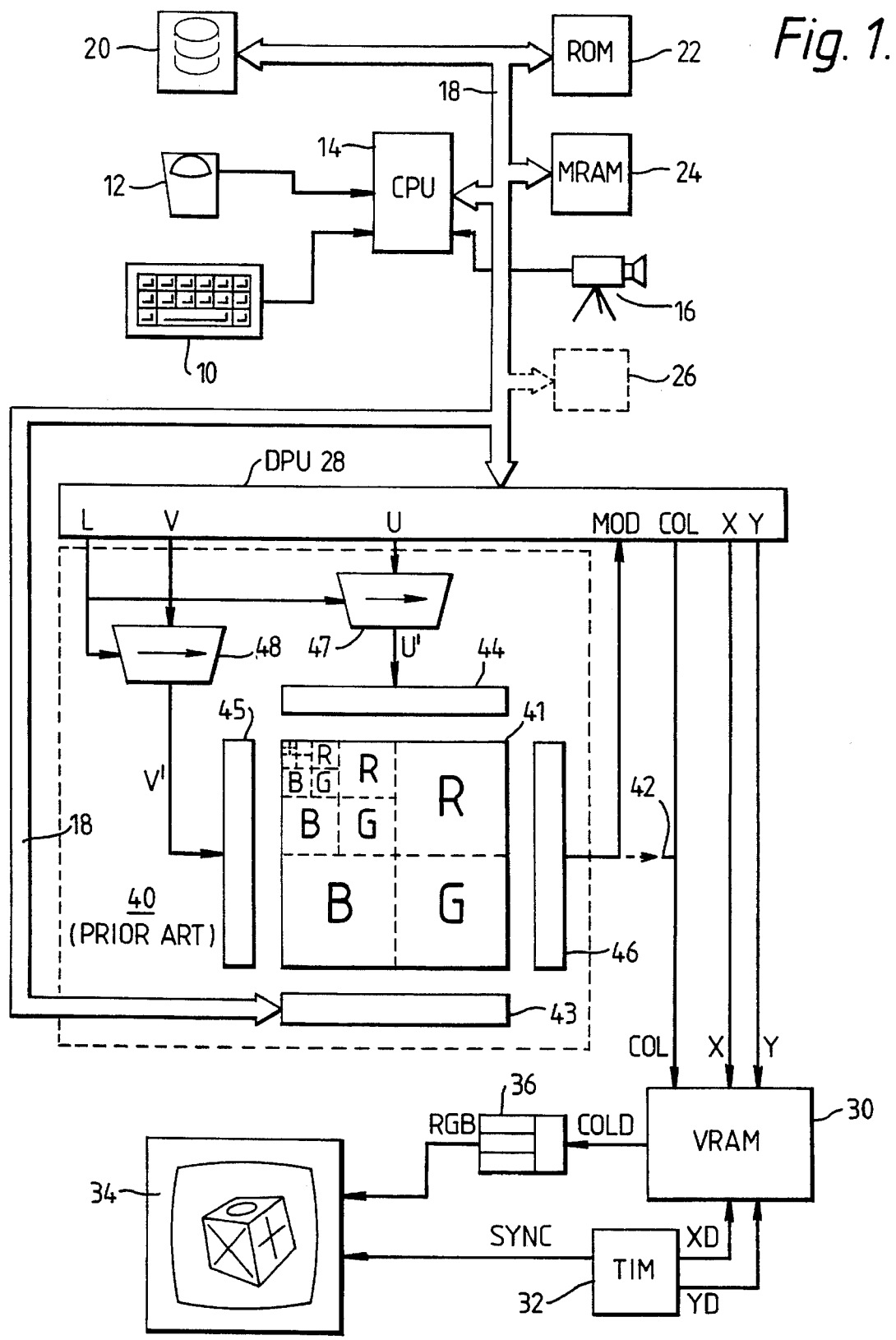
FIG. 1 is a block diagram of a display apparatus including a known type of texture mapping hardware.

FIG. 1 is a block diagram of a display apparatus including a known type of texture mapping hardware. A keyboard 10 and a tracker ball-type input device 12 provide input from a user to a central processing unit (CPU) 14. The tracker ball 12 may be used for designing 3-D objects to be manipulated by the system, in a known manner. Other input devices may also be used, of course, such as a joystick, digitizing tablet, or a "mouse". Such devices may also be used to manipulate images created by rotating, zooming etc. In general, such devices can be used more intuitively and efficiently than a conventional keyboard alone. Objects and also photographic images to be applied to object surfaces by texture mapping can also be input from a video source such as a camera 16.

The CPU 14 is connected via a bus 18 (for example a VME bus) to a disc store 20, a ROM 22 and a main memory (MRAM) 24. The disc store, which may include magnetic floppy discs, hard discs, and/or optical memory discs, is used for storing data (for example images or 3-D model data) which can then be recalled and manipulated to generate new images as desired. Such data may include the user's work from previous input sessions, and/or commercially generated data, for example for use in interactive computer-aided design or computer simulations for education or entertainment. To allow modelling of 3-D objects, such data will generally be stored as polygonal model data rather than in the form of two-dimensional images. In that case, the data corresponds to a 3-D model containing objects which are typically broken down into groups of polygonal surfaces (primitives) in a 3-D "object" space (triangular or quadrilateral surfaces for example). The data for each object in the model comprises a list giving the position and nature of every polygon that goes to make up the object, including the relative positions of its vertices and the color or transparency of the polygon surface. In other systems, primitives may comprise curved surface patches, as is known in the art. It is known that a "texture" can be specified for mapping onto the surface, so that detail can be represented without increasing the number of primitives that make up the scene. A texture map is a stored 2-D array of texture element ("texel") values defining a 2-D pattern of modulation that may for example define the color of pixels in a manner to described below. The texture may alternatively modulate other quantities such as reflectance or surface normal direction, as is known in the art. These texture maps may also be stored in the disc store 20 and recalled as required.

The CPU 14 and the other components of the system then translate the 3-D model "world" in object space into a two-dimensional view for the user (in "viewer" space), from whatever viewpoint the user chooses, by means of geometric transformations effecting translations, rotations and perspective projections, generally by means matrix multiplication of vertex coordinates. The CPU 14 may also perform clipping and lighting calculations on a per-primitive or per-vertex basis.

The ROM 22 and MRAM 24 provide program memory and workspace for the CPU 14, which may comprise a microprocessor, such as a Motorola MC68020. Special processing hardware 26 may be provided to assist the CPU 14 to perform the large number of arithmetic operations required to convert all but the simplest models into a two-dimensional scene. The hardware 26 may comprise standard arithmetic circuits or it may include more powerful custom-built or programmable digital signal processing (DSP) integrated circuits, and may be connected to the CPU 14 for example via a VME bus connection. The nature of the hardware 26 will depend on the requirements of the system, for example with respect to speed, resolution, number of primitives per scene, etc.

A display processing unit (DPU) 28 is connected between outputs of the CPU 14 (the bus 18) and inputs of a display memory (VRAM) 30. The display memory 30 stores pixel data COL in raster-scan format. The pixel data COL might typically include for each pixel three 8-bit values (total 24 bits) corresponding to red (R) green (G) and blue (B) components of the desired image. Those skilled in the art will appreciate that in other embodiments fewer or more bits may be provided for, or the bits might define the color in terms of different components.

In the DPU 28 the primitives are "scan converted" so that they may be drawn into the display memory 30. Scan conversion is a process whereby the pixels covered by each primitive are written row-by-row and pixel by pixel, in the same way that the complete image will be scanned for output to the display.

A timing unit (video controller) 32 generates read-address signals XD and YD to address the pixel data within the VRAM 30 synchronously with the raster-scanning of a display screen 34. In response to these address signals, the locations in the VRAM 30 are scanned row-by-row and column by column to read color values COLD which are fed to a digital-to-analogue converter (DAC) 36. If a non-RGB color code is used, a matrix circuit or color look-up table may be provided to translate the pixel data COLD into the equivalent RGB signal for supply to the display screen 34, which may for example be a cathode-ray tube (CRT) display screen. The display 34, directly or indirectly, also receives timing signals (SYNC) from the timing unit 32.

To draw or "render" a primitive, the CPU 14 (or the special hardware 26) causes registers within the DPU 28 to be loaded, via the bus 18, with values defining a single primitive (for example in terms of vertex coordinates, edge slope and so on) and its. various attributes—color, reflectance and so forth. The DPU 28 then generates pixel coordinates (X and Y) so as to scan systematically the entire area covered by the primitive. The pixel coordinates X and Y are applied as write addresses to the VRAM 30, so that a pixel value COL can be written into the VRAM 30 for every pixel.

The pixel values COL can be generated so that a basic surface color of the primitive is modulated to account realistically for attributes of an object's surface (for example color, transparency, diffuse reflectance, specular reflectance) and of the 3-D environment (for example locations, colors and shapes of light sources, distance haze). This modulation can be generated arithmetically from parameters loaded with the primitive data, for example to produce smoothly varying shading to simulate a curved surface. However, to provide more detailed modulation, it is known to use mapping hardware such as that referenced 40 to supply modulation values MOD according to a predetermined pattern stored in advance in a texture memory 41.

Figure 2:
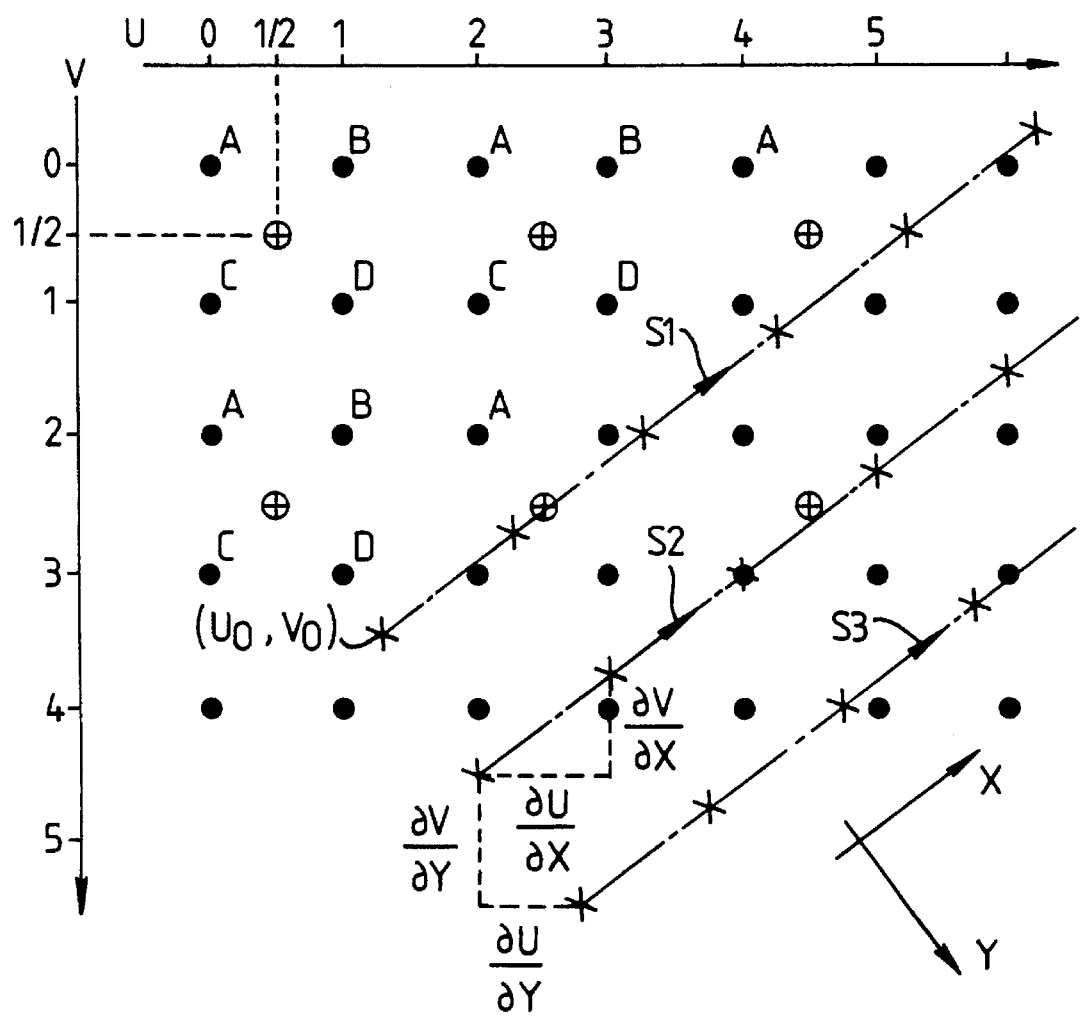
FIG. 2 shows a 2-D array of texel values stored in a texture memory.

To this end, the DPU 28 generates a pair of texture coordinates U and V simultaneously with each pair of pixel (display) coordinates X and Y so that the modulation pattern is mapped onto the primitive surface, implementing geometric transformations (i) from texture space into object space and (ii) from object space into viewer (display) space. FIG. 2 provides an illustration of the relationship between texture space, defined by the horizontal and vertical axes labelled U and V, and screen space defined by the oblique axes X and Y. The actual stored texel values correspond to integer values of U and V and are represented by a square array of solid circular dots. The locations of the pixels in screen space are marked by diagonal crosses ('×') and lie along scanlines referenced S1, S2 and S3 etc. parallel to the X-axis.

To define the coordinates U and V required to address texel values corresponding to the series of pixel values on the scanlines S1, S2, S3 etc., the CPU 14 (or drawing hardware 26) may for example provide the DPU 28 in advance with the coordinate pair $(U_0, V_0)$ corresponding to the first pixel on scanline S1, and also partial derivatives $\partial U/\partial X$ and $\partial V/\partial X$ defining the slope of the screen space scanlines S1, etc., in texture space and partial derivatives $\partial U/\partial Y$ and $\partial V/\partial Y$ defining the slope of the pixel columns in texture space. In the example illustrated, the transformation from texture space to screen space is linear. In a more general case, the scanlines S1, etc., and the pixel columns might diverge or converge, or even curve, in which case the partial derivatives vary from point to point across the primitive.

The texture coordinates U and V are processed within the mapping hardware 40 in a manner to be described below and applied to the texture memory 41 so that a modulation value MOD is available for each pixel location X,Y being addressed. The value MOD commonly comprises a color value, and in principle it could directly form the pixel value COL and be fed directly into the display memory (VRAM) 30, as shown by the dotted data path 42. More commonly, however, even if the values MOD are color values, they will need to be modified within the DPU 28 to allow for realistic lighting effects. In a more general case, the modulation values MOD are used within the DPU 28 together with other parameters to modify the pixel values COL less directly. For example, in so-called "bump mapping", the values MOD modulate the surface normal direction of the primitive, so as to affect subsequent lighting calculations and so, indirectly, the pixel values COL. Another technique, known as "environment mapping" uses the TRAM to store an image of the environment, for example using U and V as spherical coordinates, so that specular reflections of a complex environment (including light sources, windows, other objects and so on) can be simulated. These and various other applications of mapping hardware are summarized in an article "Survey of Texture Mapping" by Paul S. Heckbert in *IEEE Computer Graphics and Applications,* November, 1986 at pages 56 to 67. Those skilled in the art will recognize that the invention may be applied in all such applications of mapping hardware.

It is known that the texels represented in the texture memory 41 will not in general correspond on a one-to-one basis with the pixels of the display and, in particular when the primitive is shown in the distance and the texture is consequently mapped onto a very small number of pixels, two-dimensional spatial filtering is required to avoid the aliasing effects that would be disturbing to the viewer if simple sub-sampling were used.

It is further known that a generalized filter cannot be applied economically in an apparatus where real-time moving images are to be synthesized, and the reference Williams describes the conventional solution to this which is to store several 2-D arrays (hereinafter referred to as "maps") for a given pattern, each being successively smaller and pre-filtered to a successively lower resolution. The DPU 28 then need only produce a level coordinate L to determine the appropriate map to use. For compact storage and for high speed access to the texel values, the maps may be chosen to be square, having power-of-two dimensions, and be stored in a square texture memory according to the "multum in parvo" ("MIP map") technique described by Williams.

FIG. 1 shows within the texture memory 41 the color components R, G and B of a texture pyramid stored as a MIP map. The largest (highest resolution) map (L=0) may for example comprise 512×512 texels, the L=1 maps comprise 256×256 texels and so on down to L=9 where each map becomes a single texel. Assuming, for the sake of example, that each texel value comprises an 8-bit value for each of the R, G and B color components, the entire texture memory 41 is thus 1 Mbyte in size.

The texel values are stored in the memory 41 in advance of rendering by the CPU 14 via the bus 18 and a writing port 43 of the memory 41. For each texel value to be read, the DPU 28 generates a 2-D coordinate pair, each coordinate (U and V) of which includes at least an integer part 9 bits in length. At the same time, the level coordinate L is generated by the DPU 28 and used to generate physical coordinates U' and V' from the "virtual" coordinates U and V for application to read address ports 44 and 45, respectively, of the texture memory 41. In response to each physical coordinate pair U', V', the memory 41 releases the R, G and B components of an addressed texel via a (24-bit) read port 46.

Because of the two-dimensional binary tree arrangement of the MIP maps in the memory 41, the required physical coordinates U' and V' can be generated simply by a pair of binary shifting circuits 47 and 48 respectively, each right-shifting the respective coordinate a number of places defined by the level coordinate L. In particular, if L=0 represents the highest level, then the address corresponding to a given texel in the level 0 map can be converted to the physical address of the corresponding texel in the level L map can be found by right-shifting the U and V coordinates L places, effectively scaling-down each coordinate by $2^L$. The level coordinate L can be supplied to the DPU 28 as part of the primitive data, but if perspective is to be accounted for in the mapping, then the level coordinate L will more probably be generated within the DPU on a per-pixel basis, dependent on the partial derivatives of U,V with respect to X,Y.

In order to allow full anti-aliasing, it is known to apply 3-D (for example, trilinear) interpolation between texel values, in which case the coordinates L, U' and V' can have fractional parts (Lf, Uf and Vf) as well as integer parts (Li, Ui', Vi'). The fractional parts of the U' and V' coordinates can be used to perform 2-D (for example, bilinear) interpolation between a square patch of four adjacent texels within one level, and the fractional part Lf of the level coordinate can be used to interpolate between (2-D interpolated) texel values from two adjacent levels of the pyramidal array. To this end, it is necessary to read four texel values (Ui',Vi'), (Ui'+1,Vi'), (Ui',Vi'+1) and (Ui'+1,Vi'+1) from the level Li map and four from the level Li+1 map. Clearly a speed penalty is involved if these eight texel values are read serially. Fortunately, the four texel values for each level can be read in parallel via the read port 46 if the texture memory is constructed as four parallel memories interleaved to allow 2×2 patch addressing, as described hereinafter, enabling the eight values to be read in only two memory read cycles. It would be desirable, however, to enable both sets of four (Li and Li+l) texel values to be read in parallel and the Williams reference suggests that a hard-wired addressing scheme could enable parallel access to all levels of a given MIP map. While this is possible in theory, the number of connections involved in the scheme proposed by Williams is too great to make it an economic solution for mass market applications. For example, with ten levels, 2×2 patch addressing (except at the lowest level) and 8 bits each for R, G and B per texel, 888 bits of data would need to emerge from the read port 46 of the texture memory 41 for every coordinate pair U,V applied.

In general, it will be desirable to store different texture pyramids in the texture memory 41. For example three texture pyramids might define the shapes 'o', '+' and '×' mapped onto the faces of the cube shown on the screen of the display 34 in FIG. 1. For this purpose, it is known to divide the square array at each level of the MIP map and store a mosaic of the corresponding 2-D arrays defining each 2-D pattern. The coordinate pairs U,V generated by the DPU 28 would then incorporate 2-D offsets to ensure that the correct part of the 2-D array is addressed. In this known technique, however, some of the space in the texture inevitably remains unused, effectively wasted. It is not possible in a general case to eliminate unused space from a mosaic of 2-D shapes. For example arranging the three square arrays representing the texture patterns 'o', '+' and '×' into the square array at each level in the texture memory 41 of the known hardware would result in at least one quarter of the available memory being wasted. Finding even an optimum solution to a general 2-D "jigsaw puzzle" is difficult, and would be quite impractical in real-time if arrays were allowed to take different shapes, such as squares, rectangles, triangles.

It is a further disadvantage of the MIP map approach that each texture pyramid occupies space at all levels (1 Mbyte in the example given above), even though, in a scene where the primitive is seen only in the distance, only one or two of the smaller maps (L=5, L=6 etc.) may actually be being used at the time. It would be very advantageous if only the levels likely to be needed were stored in the texture memory at any one time and the freed space could be used for other texture maps. For example, even though the largest map (L=0) of the pyramid may never actually be read in the course of rendering an image, it still occupies three-quarters of the total texture memory storage. Unfortunately, it would be very difficult to provide the known hardware with the flexibility to overcome either of the above disadvantages.

Figure 3:
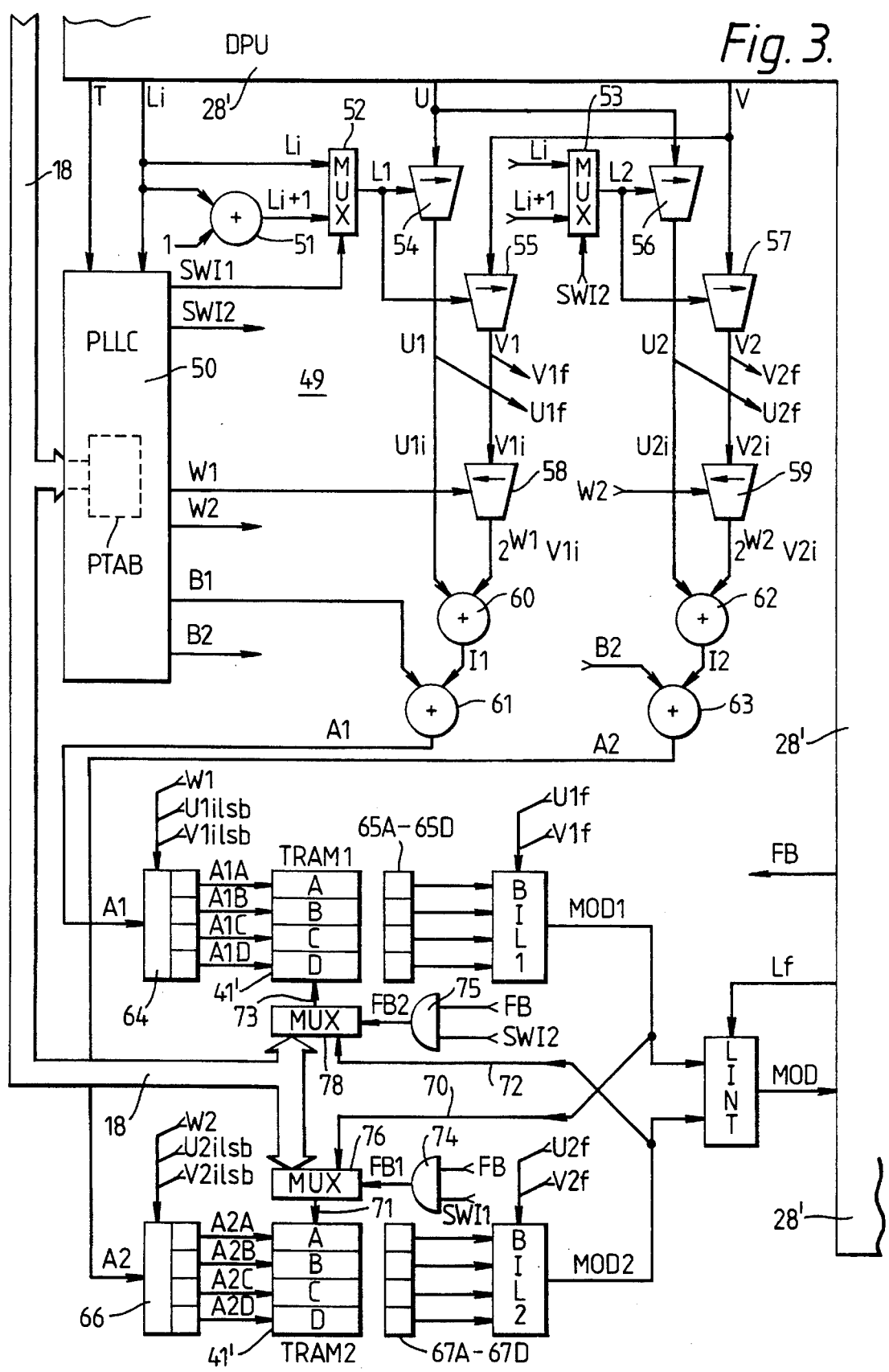
FIG. 3 is a block schematic diagram of novel texture mapping hardware embodying the present invention.

FIG. 3 shows novel mapping hardware that can be substituted for that shown at 40 in FIG. 1. A linearly-addressed texture memory 41' is provided, so that the problem of eliminating wasted space is readily solvable. A texture management circuit 49 keeps track of the various arrays within the linear memory 41' and serves to convert the pyramidal coordinates L, U and V into linear physical texel addresses. Instead of using a 2-D offset to identify different textures all stored as a mosaic within a large map, the CPU 14 in the novel system supplies, with the primitive data, a texture identifying value T separate from the coordinates U and V. Any 2-D map forming part of a texture pyramid can thus be identified as map T.Li, where Li is the integer part of the level coordinate L. The circuit 49 is more complex than the simple 2-D MIP addressing hardware, but the improvement in memory utilization and flexibility may be very great.

The DPU 28' in FIG. 3 is a slightly modified version of the conventional DPU 28 (FIG. 1), having an output T for passing the received identifying value to the texture management circuit 49. The modified DPU 28' also has an output carrying a logic signal FB for activating feedback paths as described in a later part of this description.

The novel hardware shown in FIG. 3 also incorporates not only 2×2 patch addressing (to allow high-speed bilinear interpolation) but also a novel parallel structure so that eight texel values are available for trilinear interpolation simultaneously, yet without the excessive parallelism of the solution proposed by Williams. For this purpose, the texture memory 41' is divided into two banks of memory, TRAM1 and TRAM2, and the system ensures that arrays T.Li and ToLi+1 for two adjacent levels of a given texture pyramid will always be stored in different banks TRAM1 and TRAM2.

The texture management circuit 49 has inputs to receive the signals T, L, U and V from the DPU 28'. The texture management circuit includes a page location and logic circuit (PLLC) 50 which receives the texture identification T and at least the integer part Li of the level coordinate L supplied by the DPU.

The PLLC 50 stores information defining for each map T.Li (i) in which bank TRAM1 or TRAM2 the map T.Li is stored, (ii) the width w(T.Li) of the map in the U-direction and (iii) a base address B(T.Li) locating the start of the linearly-stored array in the appropriate bank TRAM1 or TRAM2.

In general terms, the PLLC 50 supplies the stored data for the maps T.Li and T.Li+1 to the remainder of the circuit 49 which is thereby enabled to generate linear addresses A1 and A2 for application to the memory banks TRAM1, and TRAM2 respectively, so as to address the texel data for coordinate pair (U,V) in the levels Li and Li+1 in the texture pyramid T. The general formulae for these linear addresses are:

$$A(T \cdot Li) = \frac{U}{su(T \cdot Li)} + w(T \cdot Li) \frac{V}{sv(T \cdot Li)} + B(T \cdot Li)$$

and $$A(T \cdot Li + 1) = \frac{U}{su(T \cdot Li + 1)} + w(T \cdot Li + 1) \frac{V}{sv(T \cdot Li + 1)} + B(T \cdot Li + 1)$$

with address A1=A(T.Li) or A(T.Li+1), depending on which of the two maps T.Li and T.Li+1, respectively, is stored in memory bank TRAM1, and address A2=A(T.Li+1) or A(T.Li), correspondingly. In the above expressions, su(T.Li) and sv(T.Li) represent generalized scale factors relating the dimensions of the map T.Li to those of the largest map (T.0) in the pyramid T, in the U- and V-directions, respectively.

As in the known system, the addressing hardware in accordance with the invention can be greatly simplified if the scaling factors su(T.Li) and sv(T.Li) are limited to powers of two, defined for example by the expression $su=sv=2^{Li}$ for all values of L and T. Further simplification of the hardware can be obtained as in the MIP map system by limiting the width values w of maps to be powers of two texels, defined for example by a width index W(T.Li) and the expression $w(T.Li)=2^{W(T.Li)}$. Both of these simplifying features are incorporated in the texture management circuit 49 shown in FIG. 3. These restrictions allow not only square but also rectangular maps, but a hardware implementation of the more general formulae given above could be constructed if desired. The general formulae could also be further generalized to allow efficient storage of other shapes, for example triangular or trapezoidal textures, by causing the width w in the U-direction to vary across the map in the V-direction in a linear or even non-linear manner.

Taking into account these limitations introduced to simplify the hardware, new formulae can be derived for translation into simplified hardware. These formulae are given below and use the symbols "→" and "←" to indicate a binary right shift (divide) and left shift (multiply), respectively. Thus for example the expression "$(U \rightarrow L1)i$" indicates the integer part of a value U after right-shifting by L1 bit positions, in other words the quotient of U and $2^{L1}$.

$$A1 = (U \rightarrow L1)i + ((V \rightarrow L1)i \leftarrow W1) + B1$$

where L1=Li or Li+1 and $w(T.Li) = 2^{W1}$, and $$A2 = (U \rightarrow L2)i + ((V \rightarrow L2)i \leftarrow W2) + B2$$

where L2=Li+1 or Li, correspondingly, and $w(T.L2) = 2^{W2}$.

Returning to FIG. 3 which shows a hardware implementation of these formulae for A1 and A2, the PLLC 50 in FIG. 3 has outputs supplying values W1, B1, W2 and B2 defining the widths and base locations for the maps to be addressed in TRAM1 and TRAM2 respectively. The PLLC 50 also generates a binary signal SWI1 which takes the value 1 or 0 depending on whether texture memory bank TRAM1 contains the map T.Li or T.Li+1. respectively, and a complementary signal SWI2=$\overline{\text{SWI1}}$ which gives the corresponding indication in relation to the other bank TRAM2 of the texture memory 41'.

In the remainder of the texture management circuit 49, an adder 51 is provided to generate the value Li+1 from the value Li generated by the DPU 28'. A multiplexer 52 responsive to the logic signal SWI1 selects either Li or Li+1 to generate the level coordinate L1 for the map stored in bank TRAM1. Another multiplexer 53, is responsive to the complementary logic signal SWI2, selects the other of Li and Li+1 to generate the level value L2 for the map stored in bank TRAM2. A first right-shifter 54, responsive to the level coordinate L1, receives the U coordinate of the pair U,V generated by the DPU 28' and generates a first scaled U coordinate U1=U→L1. A second right-shifter 55, responsive to the same level coordinate L1, requires the V coordinate and generates a first scaled V coordinate V1=V→L1. Third and fourth right-shifters 56 and 57 also receive the U and V coordinates, respectively, and are responsive to the level coordinate L2 to generate second scaled U and V coordinates U2=U→L2 and V2=V→L2, respectively, for the map stored in the second bank TRAM2 of the texture memory 41'.

The scaled coordinates U1, V1, U2 and V2 are all separated into their integer parts U1i, etc., and their fractional parts U1f, etc. First and second left-shifters 58 and 59 receive the integer parts V1i and V2i of the scaled V coordinates V1 and V2, respectively, and are responsive to the width indices W1 and W2, respectively, so as to generate values $2^{W2}.V2i$, respectively, where $2^{W1}$ and $2^{W2}$ are the widths of the maps stored in the banks TRAM1 and TRAM2, respectively.

An adder 60 adds the integer part of U1i of the first scaled U coordinate U1 to the value $2^{W1}.V1i$ generated by the first left-shifter 58 to generate a first linear offset address I1. A further adder 61 adds the first offset address I1 to the first map base address B1 generated by the PLLC 50 to generate the first linear texel address A1 for application to the first bank TRAM1 of the texture memory 41'. Similarly, a further adder 62 generates a second linear offset address I2 by adding the values U2i and $2^{W2}.V2i$, while a still further adder 63 adds the second linear offset address I2 to the record map base address B2 generated by the PLLC 50 to generate the second linear texel address A2 for application to the second bank TRAM2 of the texture memory 41'. Since the bits of value V1i (or V2i), once shifted, do not overlap with those of the value U1i (U2i), the adders 60 and 62 can in fact be implemented by simpler OR-gates.

Each texture memory bank TRAM1 and TRAM2 is further divided as shown into four parts A, B, C, and D which can be addressed in parallel. The texel values defining a given map are distributed between the four parts A–D of the appropriate memory bank (TRAM1 or TRAM2) according to a predetermined pattern such as that illustrated by the letter A, B, C or D next to each texel value (solid circle) in FIG. 2, so as to allow parallel addressing of a 2×2 patch of texels. In the example pattern shown, in an even numbered line of texels (V even), texel values are stored alternately in parts A and B. In odd-numbered lines (V odd) the values are stored alternately in parts C and D.

To enable this patch addressing, a special address port 64 receives the linear texel address A1 from the output of adder 61 and generates therefrom four addresses A1A–A1D for application to the four memories TRAM1A to TRAM1D, respectively, in response to which the texel values for the patch (U,V), (U+1,V), (U,V+1) and (U+1,V+1) become available via four corresponding read ports 65A–65D.

To enable generation of the correct four addresses A1A–A1D, the address port 64 receives the least significant bits U1i1sb and V1i1sb of the integer parts of the first scaled coordinate pair U1,V1, which define whether U1 and V1, respectively, are odd or even. With regard to the detailed design of the patch addressing hardware 64, 65A–65D, this can be similar to that used for transforming digitized video images, an example of which is shown in FIG. 2 of an article "Transforming Digital Images in Real Time" by Joel H. Dedrick in *ESD: The Electronic System Design Magazine,* August, 1987 at pages 81 to 85. One difference from the known hardware is necessitated by the linear storage of the texel arrays in the system shown in FIG. 3. In the Dedrick circuit, which uses a 2-D addressable framestore memory, a unit value 0001 is added to the vertical coordinate (Y') to address the texel values in the next row (Y'+1) of the image. In the circuit of FIG. 3, however, the width $w(T.Li) = 2^{W1}$ of the array must be added to the linear address A1 to address correctly the texel values for the next row V1+1 of the linearly stored texture map. To this end, the address port 64 also receives the width index W1 generated by the PLLC 50 for the map stored in bank TRAM1.

A similar patch address port 66 is provided for the second bank TRAM2 of the texture memory 41' and receives the second linear address A2, odd/even indicators U2i1sb and V2i1sb and the second width index W2. The port 66 generates patch addresses A2A–A2D which are applied to respective parts A–D of the second texture memory bank TRAM2 which has four corresponding read ports 67A–67D.

It may be noted that many alternative arrangements may be suitable for generating the patch addresses A1A–A1D and A2A–A2D. For example, instead of generating the single linear address A1 and then expanding it to form addresses A1A–A1D, it may be advantageous to integrate the patch addressing function with the linear address generating function, to generate each of the addresses A1A–A1D directly from the coordinates L1, U1 and V1. While some components may need to be quadruplicated in such an embodiment, other components can contribute to the generation of at least two of the addresses A1A–A1D. It will also be appreciated that larger patches could be addressed with more parallel memories and suitable ports.

The four texel values from the read ports 65A–65D of bank TRAM1 are supplied to inputs of a first bilinear (2-D) interpolator BIL1 which also receives the fractional parts U1f and V1f of the first scaled coordinate pair U1,V1. The bilinear interpolator BIL1 combines the four texel values in the patch addressed by addresses A1A–A1D (derived from the integer parts U1i and V1i of the pair) so as to generate a first bilinearly interpolated texel value MOD1. The texel values from the read ports 67A–67D of bank TRAM2 are similarly applied to a second bilinear interpolator BIL2 which also receives the fractional parts U2f and V2f of the second scaled coordinate pair U2,V2 and generates a second bilinearly interpolated texel value MOD2.

The two bilinearly interpolated values MOD1 and MOD2, one derived from the map T.Li and the other derived from the map T.Li+1 are then fed to a linear interpolator LINT. The interpolator LINT combines the values MOD1 and MOD2 in proportions determined by the fractional part Lf of the level coordinate L received from the DPU 28 to generate a trilinearly interpolated modulation value MOD for the pyramidal coordinates L, U and V. As in the known apparatus (FIG. 1), the value MOD may be used to effect a modulation of pixel color values COL either directly (dotted path 42) or indirectly via further processing in the DPU 28'.

Where the texel values MOD define colors, it will be appreciated that each texel value will comprise three color component values such as R, G and B, and the interpolators BIL1, BIL2 and LINT may in fact comprise three interpolators each, or may be adapted in some other way to perform the three-component interpolation.

The hardware shown in FIG. 3 also incorporates first and second feedback paths 70 and 72 so that the bilinearly interpolated values MOD1 from the first memory bank TRAM1 can be fed into a write port 71 of the second bank TRAM2 of the texture memory 41' and the values MOD2 from the second bank TRAM2 can be fed into a write port 73 of the first bank TRAM1. The logic signal FB supplied by the DPU 28' indicates in the '1' state that a feedback path is to be activated. AND gates 74 and 75 combine the signal FB with the logic signals SWI1 and SWI2 respectively generated by the PLLC 50 to generate a pair of logic signals FB1 and FB2, respectively. Two multiplexers 76 and 78 are responsive to the signals FB1=1 and FB2=1, respectively to complete either the first or second feedback path 70 or 72, respectively, when FB AND SWI1=1 or FB AND SWI2=1, respectively. At all other times, each multiplexer 76 or 78 serves to connect the corresponding write ports 71 or 73 with the CPU 14 via the bus 18. The purpose of the feedback paths 70 and 72 will be described in due course but for the moment it should be assumed that they are not active (FB=0).

FIG. 4 shows, by way of example, three part-pyramidal texture maps (T: 1,2,3) stored in the linear memory banks TRAM1 and TRAM2 so as to allow parallel access to all the texel values required for trilinear interpolation. Each memory bank constitutes a linear physical address space A1 or A2, respectively. The 2-D array (map) of texel values for level Li of map T is stored in linear form as a page of data referenced PT.Li. Texture 1 can be seen to have four pages P1.0, P1.1, P1.2 and P1.3, each one quarter of the linear size of the previous page. While P1.0 is stored in bank TRAM1, page P1.1 is stored in bank TRAM2, P1.2 in bank TRAM1 and so on, alternating for as many levels as are stored.

The second texture (T=2) is stored as three pages P2.1 to P2.3, alternating between banks TRAM1 and TRAM2, each with a corresponding entry in the page table memory PTAB, described below with reference to FIG. 5. A highest level page P2.0 exists, but, because it is not required at the time illustrated, it is not stored in the texture memory, so that more free space (shaded) is available to receive other maps as required. In fact, the memory map shown in FIG. 4 may represent a time when many different maps, forming various levels of various texture pyramids, have been loaded, used and then deleted as the corresponding texture has become not required, or not required at such a high (or low) resolution. It should be noted that even if more texel data is required than there is room for in the banks TRAM1 and TRAM2 of the texture memory 41', at least a low resolution map can be loaded and interpolated to the size required until the space does become available. This "graceful degradation" characteristic of the linear texture memory contrasts favourably with the known 2-D MIP map memory in which a texture pyramid generally occupies space at all levels or not at all.

The third texture (T=3) is also only loaded in three pages, again alternately between TRAM1 and TRAM2, but page P3.0 is smaller than the Li=0 pages of the first two textures, simply because there is less detail required to define the third texture. This again allows more efficient usage of texture memory capacity compared with the conventional MIP map.

FIG. 5 shows the contents of the page table memory PTAB, shown dotted within the page location and logic circuit PLLC 50 of FIG. 3, which enables a given array T.Li to be found in the memory. There is an entry in the page table for each page PT.Li of each texture. A first item in each entry is a single bit value SWI1/$\overline{SWI2}$ which takes the value 1 or 0 depending on whether the page is stored in the bank TRAM1 or the bank TRAM2, respectively. This bit value therefore enables the logic circuit PLLC to generate the signals SWI1 and SWI2 to control the generation of the addresses A1 and A2 as described with reference to FIG. 3.

A second item in each entry in the table is the width index W of the map T.Li. The page P1.0 contains a map $2^W=2^9=512$ texels wide, P1.1 a map $2^8=256$ texels wide, P3.1 a map $2^7=128$ texels wide and so on. A third item in each entry contains the base location B in the memory (TRAM1 or TRAM2) starting at which the texel values comprising that page are stored.

Returning to FIG. 3, the arrays of texel values forming the pages P1.0, etc., can be stored in the memory banks TRAM1 and TRAM2 by the CPU 14 via the bus 18 and write ports 71 and 73 respectively as shown. It is a straightforward matter of "housekeeping" for the CPU 14 to ensure that (i) any new page of texel data is stored in an otherwise unused part of the texture memories, (ii) each alternate level of a given pyramid is stored in a different bank TRAM1 or TRAM2 and (iii) that the page table PTAB in the PLLC 50 is at the same time loaded with the appropriate values of SWI1/$\overline{SWI2}$, W and B. If enough space is not available in a single block for a new texture (perhaps P2.0 is to be loaded), then a "garbage collection" operation can be carried out to gather the unused areas together into a large enough area.

Entire pyramidal texture arrays may be stored in a database in the disc store 20 or in the main memory 24, with the various 2-D level arrays (maps) being transferred to spare locations in the appropriate texture memory as required. However, the provision of the feedback paths 70 and 72 enables the bilinear interpolators BIL1 or BIL2 to be used as filters in a manner to be described below to generate maps for successive levels from a single, high resolution map loaded via the bus 18. This may be advantageous, since the hardware with patch-addressing and interpolation may provide a much faster filter than the conventional alternative which is a software routine executed by the CPU 14.

FIG. 6 shows a flowchart defining a sequence of operations performed to generate a filtered map T.Li+1 from a map T.Li previously stored in one bank of the texture memory 41', using the feedback of values generated by the existing bilinear interpolators. In a first step 80, the CPU 14 allocates texture memory space for the page PT.Li+I by loading an entry comprising appropriate values SWI1/SWI2 (T.Li+1), W(T.Li+1) and B(T.Li+1) in the page table PTAB within the PLLC 50.

Next, in a step 82, the DPU 28' is caused to set the logic signal FB=1 to enable activation of the appropriate feedback path 70 or 72. In step 84, the DPU 28' arranges that any values MOD generated by the linear interpolator LINT during the filtering process are ignored. In a step 86, the DPU 28 is set up as it would be for drawing a polygon, with values for $U_0$, $V_0$ and the partial derivatives chosen so as to cause the generation of the desired filtered values. Referring to FIG. 2, suitable texel positions for the filtered map T.Li+1 are marked by circled crosses ("+"). To cause the generation of values interpolated to these texel positions, the starting position would be $(U_0,V_0)= (½,½)$, with partial derivatives as follows:

$$\frac{\partial U}{\partial X} = 2; \frac{\partial V}{\partial X} = 0; \frac{\partial U}{\partial Y} = 0; \frac{\partial V}{\partial Y} = 2.$$

In step 88, the DPU 28' is caused to "draw" the imaginary polygon, leading to the automatic generation of the desired filtered values MOD1 or MOD2 at the output of the bilinear interpolator BIL1 or BIL2, depending on whether the source map T.Li is stored in bank TRAM1 or TRAM2. At the same time, because logic signal FB=1 and either SWI1=1 or SWI2=1, either FB1=1 or FB2=1, and consequently one of the multiplexers 76 and 78 is activated to complete the appropriate feedback path 70 or 72. The interpolated values are then automatically written into the locations in the other memory bank (TRAM2 or TRAM1) that were allocated for the map T.Li+1 in step 80.

The process of FIG. 6 can be repeated if required, incrementing the level coordinate L each time as shown dotted in step 90, to use the feedback paths 70 and 72 alternately, until an entire pyramidal array may have been generated within the display processor from a single externally generated high-resolution array. Those skilled in the art will appreciate that different scaling factors are possible, and asymmetrical filtering would be possible in embodiments where asymmetrical maps are allowed for, for example to generate a rectangular map from a square one. As a particular example, using $(U_0, V_0) = (0,0)$ with $\frac{\partial U}{\partial X} = 1; \frac{\partial V}{\partial X} = 0;$ $\frac{\partial U}{\partial Y} = 0$ and $\frac{\partial V}{\partial Y} = 1$ would provide a texel-for-texel transfer of a map from one bank of the texture memory to the other. Such a transfer may be useful in the "garbage collection" operations mentioned above.

The use of the texture mapping hardware itself for map filtering and/or transfer has advantages over the conventional method using software running on the host computer, because the display processor hardware is already specialized for rapid addressing of texture arrays, including 2×2 patch addressing hardware, interpolating hardware geared to receive R, G and B in parallel, and so forth. This advantage can be readily appreciated by considering that filtering or transferring a 2-D array in this apparatus takes about the same amount of time as it would take to render a single, similarly sized polygon. This is an overhead that can generally be absorbed in real-time without a significant loss in performance since a typical system may already be rendering hundreds or even thousands of polygons in each image frame.

The limitations on map sizes and so forth imposed in the embodiment described simplify the construction, for example, of the PLLC 50 and allow the use of bit shifters 54 to 59 instead of complex multipliers. These limitations also simplify the allocation of space to new pages in the texture memory. Clearly, however, the design need not be limited to this case, and some variations will be enumerated below. For example, the width index W would not need to be stored separately if it were known that a map's width was always $2^{N-Li}$, where $2^N$ is the size of the largest permitted map. Thus, in the example of FIGS. 4 and 5 where the highest level of the texture T=3 is only 256 texels wide, the width index could be eliminated if the page P3.0 were renamed P3.1, and so on, since it could then be known that all maps with Li=1 have W=8 (width=256), whether or not there exists a larger map with Li=0. To cater for asymmetrically filtered maps, two level values Lu and Lv could be supplied, identifying a previously stored map of $2^{N-Lui}$ texels by $2^{N-Lvi}$ rows. Other variations that may be allowed, will be readily apparent to those skilled in the art who will also readily appreciate the variations in the structure of the texture management circuit that would be required to implement such variations.

From reading the present disclosure, yet other variations will be apparent to persons skilled in the art. Such variations may involve other features which are already known in the design, manufacture and use of electronic graphics systems, texture mapping hardware and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The Applicant hereby gives notice that new claims may be formulated to such features and/or combinations of such features during the prosecution of the present application or of any further application derived therefrom.

I claim:

1. A converter circuit for converting pyramidal texture coordinates into corresponding linear (one dimensional) physical texture memory addresses in an electronic display apparatus, said converter circuit comprising:

a pyramidal coordinate input for receiving a two-dimensional (2-D) texture coordinate pair and an associated level coordinate; and means for generating, from the received coordinate pair and level coordinate, a corresponding linear (one dimensional) physical texture memory address;

wherein the means for generating the linear (one dimensional) physical texture memory address comprises:

means for generating, from the received level coordinate, page location information locating a corresponding array of texel values in a linear address space, said page location information including information defining a linear base address and a width value for the corresponding array; and a texture address converter comprising offset generating means for combining the 2-D texture coordinate pair with the width value and the level coordinate to generate a linear offset address, and linear address generating means for combining the base address with the generated linear offset address to generate a linear physical texture memory address for application to a linearly-addressed texture memory.

2. A converter circuit as claimed in claim 1, wherein the offset generating means includes means for scaling two texture coordinates in accordance with a scaling factor defined by the level coordinate.

3. A converter circuit as claimed in claim 2, wherein the scaling factor is a power of 2 and the scaling means comprises means for bit-shifting a binary representation of each of the two texture coordinates a number of places defined by the level coordinate.

4. A converter circuit as claimed in claim 2, wherein the offset generating means comprises means for multiplying one of the two sealed texture coordinates by the width value and adding the product to the other of the two scaled texture coordinates.

5. A converter circuit as claimed in claim 4, wherein the width value is a power of two and the multiplying means comprises means for bit-shifting a binary representation of the one scaled coordinate a number of places defined by a width index received from the page location means.

6. A converter circuit as claimed in claim 3, wherein the offset generating means comprises means for multiplying one of the two scaled texture coordinates by the width value and adding the product to the other of the two scaled texture coordinates.

7. A converter circuit as claimed in claim 6, wherein the width value is a power of two and the multiplying means comprises means for bit-shifting a binary representation of the one scaled coordinate a number of places defined by a width index received from the page location means.

8. A converter circuit as claimed in claim 5, further comprising:

means for generating n further physical addresses to form a group of n+1 physical addresses all corresponding to the same level coordinate but with 2-D texture coordinate pairs offset from the received coordinate pair so as to allow parallel addressing of a patch of n+1 texel values in a stored array.

9. A converter circuit as claimed in claim 1, further comprising:

means for generating n further physical addresses to form a group of n+1 physical addresses all corresponding to the same level coordinate but with 2-D texture coordinate pairs offset from the received coordinate pair so as to allow parallel addressing of a patch of n+1 texel values in a stored array.

10. A converter circuit as claimed in claim 9, wherein said converter circuit further comprising:

means for generating a further physical address corresponding to the same 2-D texture coordinate pair but with a level coordinate offset from the received coordinate; and selection means responsive to the page location information whereby the physical address and the further physical address may be applied to different ones of two separate, parallel-addressable texture memory banks.

11. A converter circuit as claimed in claim 1, said circuit arrangement further comprising:

means for generating a further physical address corresponding to the same 2-D texture coordinate pair but with a level coordinate offset from the received level coordinate; and selection means responsive to the page location information whereby the physical addresses) and the further physical address may be applied to different ones of two separate, parallel-addressable texture memory banks.

12. A display apparatus comprising a host processor with associated main memory for the storage of object primitive data and texture definitions and a display processor with associated display memory and texture memory, the host processor comprising:

means for storing in the texture memory at least one pyramidal array of texel values, said pyramidal array comprising a plurality of two-dimensional (2-D) arrays of texel values representing a given 2-D modulation pattern at at least two levels of resolution defined by respective values of a level coordinate; and means for supplying object primitive data to the display processor, including an indication that a pattern of modulation is to be applied to the object primitive in accordance with texel values stored in the pyramidal array in the texture memory;

the display processor comprising:

means for generating from the object primitive data a series of pixel addresses for application to the display memory and a corresponding series of 2-D texture coordinate pairs each with an associated level coordinate, to effect a mapping of the stored texel values representing a pattern or modulation on to the object primitive at a level or levels of resolution defined by the associated level coordinate; and means for receiving each 2-D texture coordinate pair and associated level coordinate and for generating therefrom a physical texture memory address for application to the texture memory;

wherein the texture memory comprises a linearly addressed (one-dimensional) texture memory, the means for storing the pyramidal array of texel values comprises means for storing each 2-D array in linear form in the texture memory and means for generating page location information for locating each such array in the texture memory, and the means for generating the physical texture memory address comprises:

a converter circuit for converting pyramidal texture coordinates into corresponding linear (one-dimensional) physical texture memory addresses in an electronic display apparatus, said converter circuit comprising:

a pyramidal coordinate input for receiving a two-dimensional (2-D) texture coordinate pair and an associated level coordinate; and means for generating, from the received coordinate pair and level coordinate, a corresponding linear (one-dimensional) physical texture memory address;

wherein the means for generating the linear/one-dimensional) physical texture memory address comprises:

means for generating, from the received level coordinate, page location information locating a corresponding array of texel values in a linear address space, said page location information including information defining a linear base address and a width value for the corresponding array; and a texture address converter comprising offset generating means for combining the 2-D texture coordinate pair with the width value and the level coordinate to generate a linear offset address, linear address generating means for combining the base address with the generated linear offset address to generate a linear physical texture memory address for application to a linearly-addressed texture memory, and means for generating n further physical addresses to form a group of n+I physical addresses all corresponding to the same level coordinate but with 2-D texture coordinate pairs offset from the received coordinate pair so as to allow parallel addressing of a patch of n+1 texel values in a stored array.

13. A display apparatus as claimed in claim 12, wherein the linear texture memory is divided into n+1 parallel-addressed memories and the texel value storage means are arranged to distribute the texel values being stored among the n+1 memories in an interleaved manner, the display apparatus further comprising 2-D interpolation means responsive to fractional parts of the 2-D texture coordinate pair for combining texel values of a 2-D patch into a single interpolated value.

14. A display apparatus as claimed in claim 13, further comprising means for generating a 2-D array of texel values for storage in the texture memory as part of a pyramidal array by causing systematic readout and 2-D interpolation of the texel values in a previously stored 2-D array forming a first level of the pyramidal array, and feedback means for storing the resulting interpolated texel values in the memory to form a 2-D array of texel values to form a second, lower-resolution level of the pyramidal array.

15. A display apparatus as claimed in claim 13, wherein the texture memory comprises separate first and second linearly addressable texture memory banks, the texel value storage means being arranged to store the 2-D arrays forming successive levels of a given pyramidal or part-pyramidal array alternately in the first and second texture memory banks, the display apparatus further comprising an interpolator responsive to a fractional part of the level coordinate for combining texel values from both levels into a single interpolated texel value.

16. A display apparatus as claimed in claim 14, wherein the texture memory comprises separate first and second linearly addressable texture memory banks, the texel value storage means being arranged to store the 2-D arrays forming successive levels of a given pyramidal or part pyramidal array alternately in the first and second texture memory banks, the display apparatus further comprising an interpolator responsive to a fractional part of the level coordinate for combining texel values from both levels into a single interpolated texel value.

17. A display apparatus as claimed in claim 12, wherein the texture memory comprises separate first and second linearly addressable texture memory banks, the texel value storage means being arranged to store the 2-D arrays forming successive levels of a given pyramidal or part-pyramidal array alternately in the first and second texture memory banks, the display apparatus further comprising an interpolator responsive to a fractional part of the level coordinate for combining texel values from both levels into a single interpolated texel value.

18. A converter circuit as claimed in claim 1, in which the means for generating page location information comprises:

a page table memory for storing page location information;

means for entering texture memory locations into the page table memory as the page location information, said texture memory locations defining the locations within the texture memory where texel value arrays corresponding to a given page are stored; and means for reading page locations from the page table memory in response to received texture coordinates and level coordinates.

* * * * *